United States Patent [19]
Canton Gongora et al.

[11] Patent Number: 5,797,568
[45] Date of Patent: Aug. 25, 1998

[54] MULTI-POSITION TELEVISION MONITOR STAND

[75] Inventors: Antonio Canton Gongora; Carlos Jesús Cruz Fernandez; José María Muñagorri Enriquez; Juan Carlos Rayo Ortigüela, all of Madrid, Spain

[73] Assignee: Telefonica de España S.A., Madrid, Spain

[21] Appl. No.: 751,489

[22] Filed: Nov. 18, 1996

[30] Foreign Application Priority Data

May 30, 1996 [ES] Spain .................. 9601480

[51] Int. Cl.$^6$ ........................... A47G 35/00
[52] U.S. Cl. ................. 248/122.1; 248/218.4; 248/230.5; 248/276.1; 248/287.1; 248/291.1; 248/921
[58] Field of Search .............. 248/121, 125.1, 248/218.4, 219.3, 278.1, 279.1, 285.1, 286.1, 287.1, 917, 919, 921, 122.1, 291.1, 292.14

[56] References Cited

U.S. PATENT DOCUMENTS

| | | |
|---|---|---|
| 2,299,218 | 10/1942 | Fener .................. 248/230.5 X |
| 4,516,751 | 5/1985 | Westbrook .................. 248/921 X |
| 4,575,063 | 3/1986 | Schlegel et al. .................. 248/230.5 X |
| 4,836,478 | 6/1989 | Sweere .................. 248/279.1 |
| 4,884,420 | 12/1989 | Finkel et al. .................. 248/917 X |
| 4,946,123 | 8/1990 | Albert .................. 248/237 |
| 4,964,606 | 10/1990 | Beam et al. .................. 248/919 X |
| 4,993,676 | 2/1991 | Fitts et al. .................. 248/917 X |
| 5,139,223 | 8/1992 | Sedighzadeh .................. 248/921 X |
| 5,393,025 | 2/1995 | Franklin .................. 248/917 X |
| 5,400,993 | 3/1995 | Hamilton .................. 248/921 X |

*Primary Examiner*—Ramon O. Ramirez
*Assistant Examiner*—Derek J. Berger
*Attorney, Agent, or Firm*—Reid & Priest LLP

[57] ABSTRACT

A multi-position television monitor stand, comprising two pieces with a rectangular footprint. One of the larger surfaces of such pieces has a deep, semicircular, concave depression to mate with the outer surface of a vertical support. The outer surface of one of the pieces has a U-shaped projection, which is bored through to accommodate a first pin with threaded ends attached to the projection using nuts, holding a projecting hollow element that connects by conventional means to a tubular element using a second pin. The tubular element has similarly tubular extensions provided with vertical plates including pairs of angled slots.

7 Claims, 3 Drawing Sheets

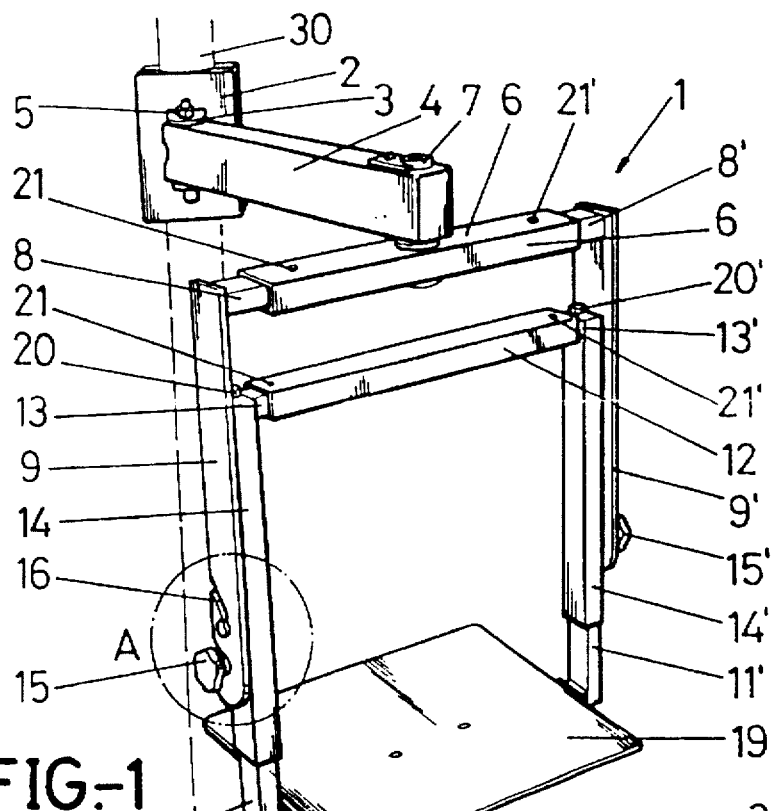
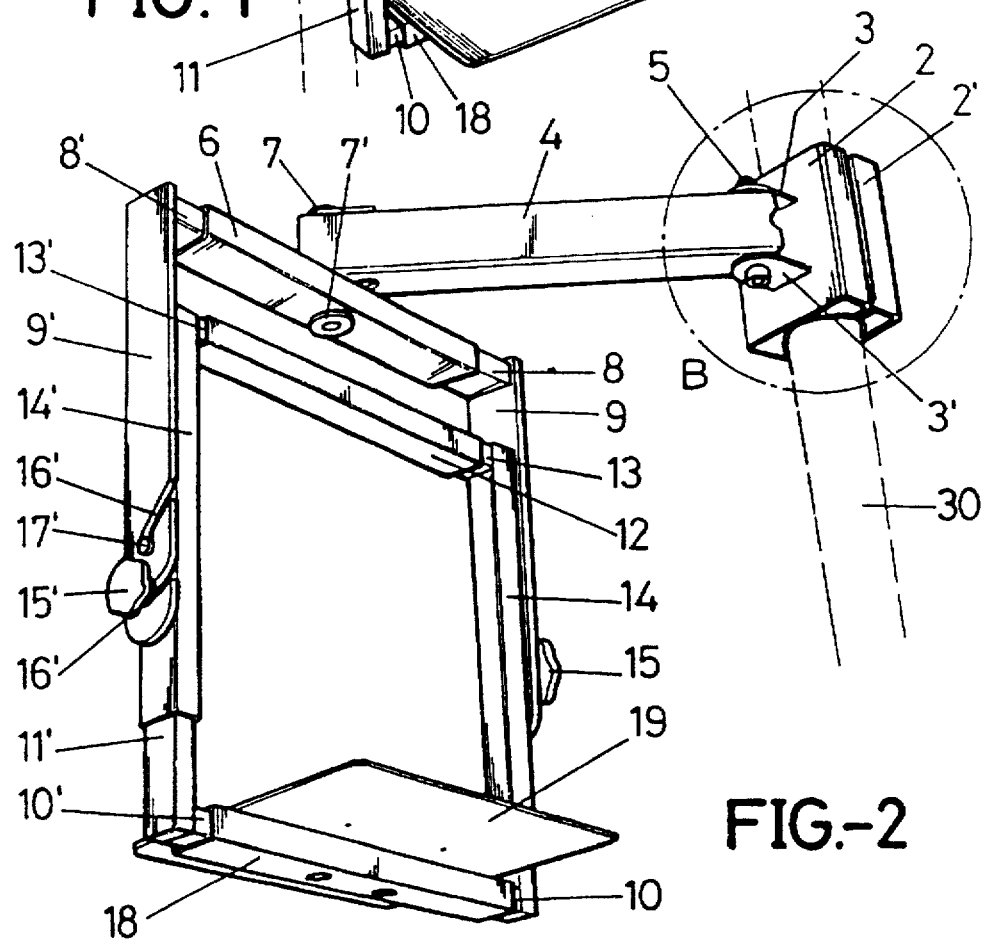
FIG.-1
FIG.-2

A

B

MULTI-POSITION TELEVISION MONITOR STAND

BACKGROUND OF THE INVENTION

1. Field of the Invention

This specification relates to an application for a utility model for The present invention relates to a multi-position television monitor stand, obviously intended to be used to position a television monitor, video monitor or similar device at a variety of angles. More specifically, the television monitor, video monitor or similar device is held within its support structure, which is in turn anchored to a vertical support using a clamping joint. A horizontal arm extends out from such joint and connects to the outer structure of the stand. Both the inner and outer structures are width- and height-adjustable to accommodate the monitor per se on the stand platform positioned on the middle cross-piece at the bottom of the inner structure.

The invention is intended for use within the industry devoted to the manufacture of equipment, devices and ancillary equipment for the television and telecommunications industry.

SUMMARY OF THE INVENTION

The multi-position television monitor stand covered by the invention constitutes in and of itself a substantial inventive step with respect to stands with fixed dimensions used for the same purpose, since this multi-position stand allows a single stand to be used for a variety of possible configurations, such that different monitor sizes can be adjusted to and perfectly accommodated on the stand, simply by adjusting the width and height of the various components of the stand itself.

In more tangible terms, the multi-position television monitor stand according to the invention comprises an element consisting of two identical pieces, which together form a parallelepiped with a central adjustment area extending lengthwise along the concave depressions on one of their larger surfaces, which can be adjusted to a vertical support with a circular section, and the piece perfectly clamped in place. A U-shaped element or plate with two bores in its flanges, into which a pin fastened using properly sized nuts is inserted, projects out from such piece. Such U-shaped element anchors a horizontal, parallelepiped extension that connects at its other end to an external structure or frame formed by the union of three elements incorporating a vertical anchoring element.

By varying the anchor point of the vertical support and the horizontal extension, the frame constituting the stand can move horizontally to point in various directions.

The outer frame comprises a middle element in the form of a hollow, rectangular tube. Two similar, but smaller tubular elements are introduced into the end opening of such middle element and slide inside it to adjust to the size of the monitor that will later be placed in the second frame.

Two flat plates extend from the outside ends of the tubes that slide inside the supporting element. Such plates have two angled slots near their lower end, which terminate in a circular area.

It is clear from the above that the outer frame has the shape of an inverted "U."

A second, four-cornered frame formed by two hollow, rectangular tubes is attached to the outer frame. The width of such second frame is adjusted to that of the larger structure or element by means of lateral endpieces extending out of vertical tubular elements.

Both the larger and the smaller, or inner, tubular elements, and the tubular element to which the monitor stand platform per se is attached, are anchored to the tubular elements that run inside them using conventional screws.

The lateral tubular elements have an internal longitudinal adjustment mechanism, whereby complementary tubular elements inserted into their lower end openings can be moved together or apart by operating the mechanism via adjustment heads on the top smaller surfaces of such elements.

Lateral extensions of the vertically sliding tubular elements are inserted horizontally into the tubular element supporting the monitor stand platform.

The entire structure described herein is made of metal.

The inner frame is attached to the outer frame via projections or lugs located on the outside, lateral surfaces of the vertical tubes containing the adjustment mechanism. Such projections or lugs are inserted into the angled slots and locked using external adjustment means.

The monitor in the stand can be tilted at a variety of angles by adjusting the width and height of the inner frame.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 is a perspective view of the multi-position television monitor stand, seen from the front.

FIG. 2 is a different perspective view of the object shown in FIG. 1, seen from behind.

DETAILED DESCRIPTION OF THE PREFERRED EMBODIMENTS

Figure 3:
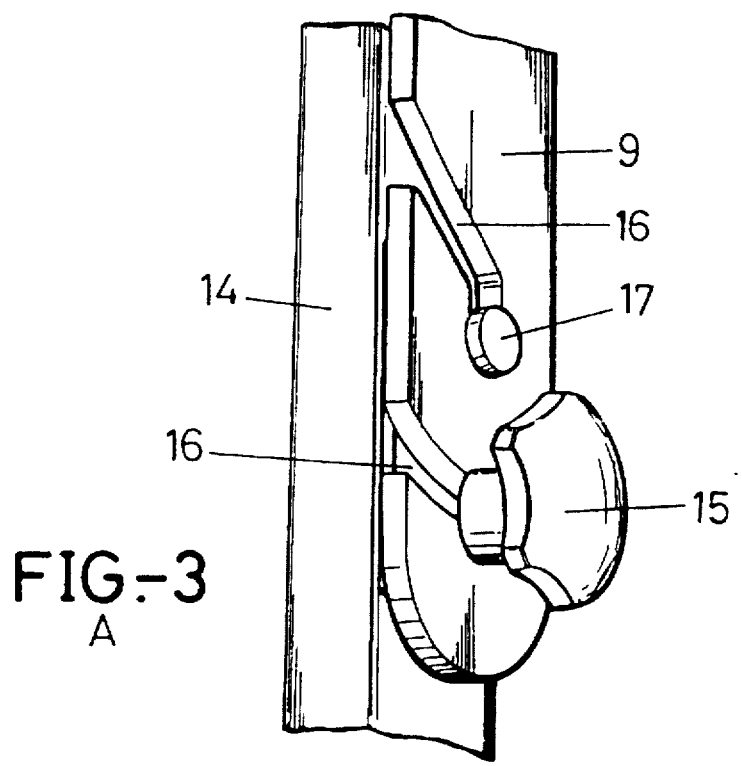
FIG. 3 shows detail A from FIG. 1.
Figure 4:
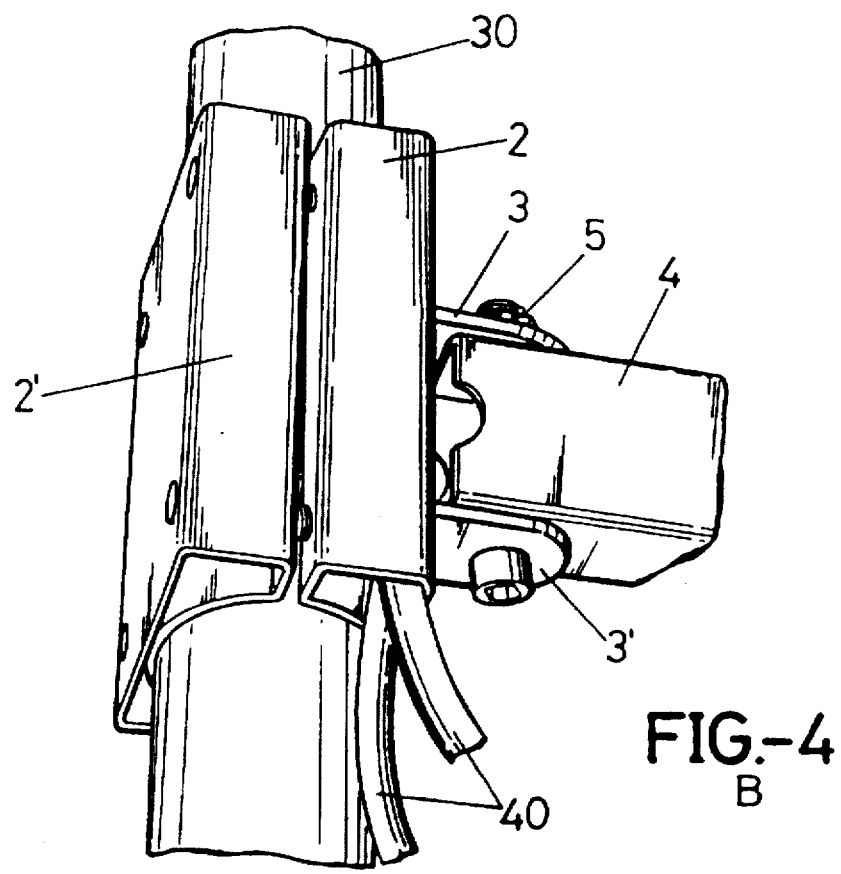
FIG. 4 shows detail B from FIG. 2.
Figure 5:
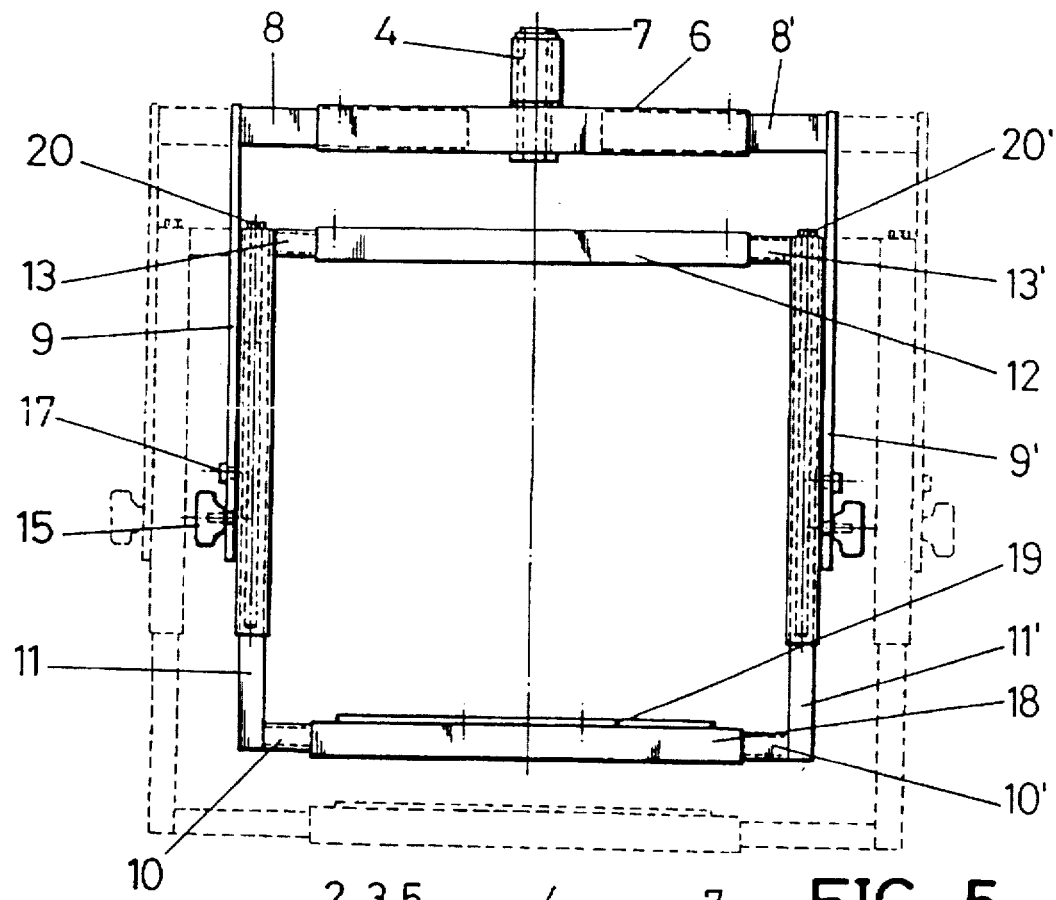
FIG. 5 is a front elevation view of the invention shown in perspective in FIGS. 1 and 2.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIGS. 1–6 clearly show how the multi-position television monitor stand 1 is supported by proper positioning of the larger surfaces of pieces 2 and 2', which have deep, concave depressions, to adjust and subsequently clamp it onto a vertical support 30. The pieces 2 and 2' are joined using conventional means, and their inside surfaces clamp vertically onto the external structure of the vertical support 30, as described.

A U-shaped element 3 extends out from the outside larger surface of the piece 2. The flanges of such U-shaped element have opposing bores, through which a pin with threaded ends passes and locks using conventional nuts, anchoring a parallelepiped extension 4 in the internal area of element 3, such that it extends horizontally from the point where pieces 2 and 2' have been previously anchored to the support 30 at a predetermined height, such that the monitor placed on the inner structure as described below can be comfortably viewed from a variety of positions.

The extension 4 is bored through at the end opposite the point where it is anchored to element 3. An anchoring element 7 passes through such bore to attach a hollow, rectangular tubular element 6 to the extension 4, such that two tubular elements 8 and 8' can be inserted into its open ends. Such tubular elements extend out from the inside surface of two elongated elements 9 and 9' at a 90° angle. The tubular extensions 8 can be anchored inside element 6 using screws 21 and 21' to adjust the extensions or tubular elements 8 and 8' to the size of the television that is to be placed on a support or platform 19 as described below.

The unit comprising pieces 9, 9', 8, 8' and 6 has the general shape of an inverted "U" and is made of metal or a similar material, as are the other pieces constituting the multi-position stand 1.

Arms 9 and 9' have two angled slots 16 and 16' at the bottom, with a circular area at the inside end of such slots.

These two angled slots on arms 9 and 9' are intended to accommodate lugs 17 and 17' and adjustable projections 15 and 15', to adjust the tilt angle of the inner structure as described below.

The "inverted-U" outer structure described above incorporates two hollow pieces 12 and 18. A rectangular piece 19 serving as a supporting platform for the monitor 50 is attached on top of piece 18.

Two tubular extensions 13 and 13' are inserted into the end openings of piece 12 and anchored to it in the desired position using screws 21 and 21'. Extensions 8 and 8' are inserted into the tubular element 6 in the same way.

Extensions 13 and 13' are connected to two vertical tubular pieces 14 and 14' at a 90° angle. The outer surfaces of such tubular pieces 14 and 14' are provided with projections 17 and 17' and locking elements 15 and 15'. Inside such tubular pieces 14 and 14' is a mechanism that uses external screws 20 and 20' to control how far tubular elements 11 and 11' can be inserted into their bottom openings, thereby making it possible to accommodate a taller or shorter monitor 50 placed on the platform 19 attached to tubular element 18, which is held internally by extensions 10 and 10' at a 90° angle to pieces 11 and 11', by inserting pieces 11 and 11' into tubular elements 14 and 14'.

Figure 6:
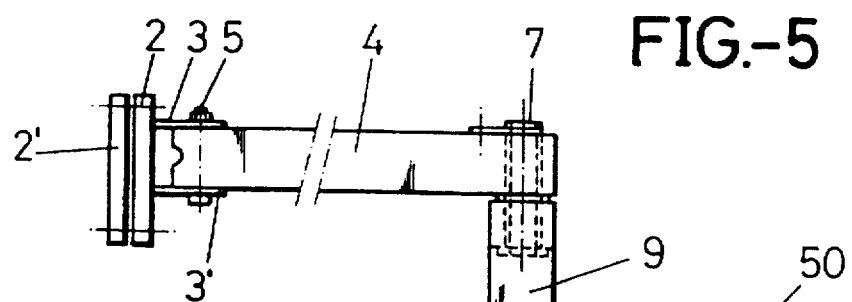
FIG. 6 is a side elevation view of the invention shown in FIGS. 1 and 2.
Figure 6:
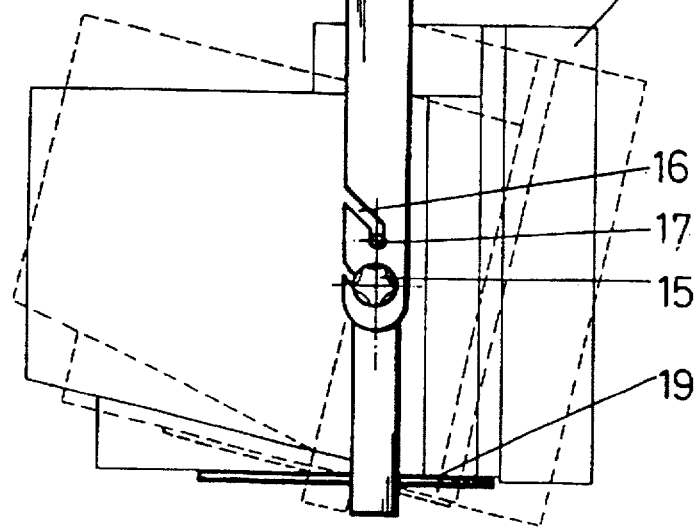

Once the pieces have been properly assembled according to the dimensions of the monitor 50, as shown in FIG. 6 the monitor can be tilted at a variety of angles by moving the inner frame formed by tubular elements 12 and 18, extensions 13 and 13' attached to pieces 14 and 14', and connected tubular pieces 11 and 11', which are height-adjusted using the mechanism controlled by the screws or similar means 20 and 20' and are provided with extensions 10 inserted into tubular element 18, on top of which the platform 19 is attached.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A multi-position television monitor stand, comprising:
    a vertical support having a convex outer surface;
    a first pin having a longitudinal axis;
    a second pin having a longitudinal axis parallel to the longitudinal axis of the first pin;
    first and second pieces each having a rectangular footprint, an inner surface, and an outer surface opposite the inner surface, the inner surface of the first piece having a deep, semicircular, concave depression to mate with the outer surface of the vertical support, the outer surface of the second piece having a U-shaped projection which is bored through to accommodate the first pin;
    a hollow element projecting from the second piece, the hollow element having a first end held on the second piece by the first pin and a second end opposite the first end;
    a first transverse tubular element having a bore therethrough and first and second opposite ends, the second pin being inserted through the bore to connect the first transverse tubular element to the second end of the hollow element;
    first and second horizontal tubular extensions inserted into the first and second ends, respectively, of the first transverse tubular element and fixed at a predetermined distance;
    first and second vertical plates extending out from the first and second horizontal tubular extensions, respectively, at a 90° angle, the first and second vertical plates each having two angled slots having a circular area at their inside end;
    first and second vertical tubular elements having upper and lower ends, and outside surface with lugs and projections with tightening joints, the angled slots accommodating the lugs and the projections with tightening joints;
    third and fourth horizontal tubular extensions extending at a 90° angle from the upper ends of the first and second vertical tubular elements, respectively; and
    a second transverse tubular element parallel to and downwardly offset from the first transverse tubular element, the third and fourth horizontal tubular extensions being inserted into the second transverse tubular element and fixed to extend at a predetermined distance from the ends of the second transverse tubular element.

2. A multi-position television monitor stand as claimed in claim 1, further comprising:
    third and fourth vertical tubular elements inserted respectively in the first and second vertical tubular elements, the first and second vertical tubular elements including internal mechanisms for controlling the positions of the third and fourth vertical tubular elements relative to the first and second vertical tubular elements, and
    pieces projecting from the upper ends of the first and second vertical tubular elements for operating the internal mechanisms from the exterior of the first and second vertical tubular elements.

3. A multi-position television monitor stand as claimed in claim 2, further comprising:
    fifth and sixth horizontal tubular extensions extending inwardly from said third and fourth vertical tubular elements, respectively, at a 90° angle;
    a third transverse tubular element having first and second ends and a top surface, the fifth and sixth horizontal tubular extensions being inserted into the first and second ends, respectively, of the third transverse tubular element and fixed extending outwardly from the first and second ends of the third transverse tubular element at a predetermined distance using screws; and
    a horizontal plate attached to the top surface of the third transverse tubular element.

4. A multi-position television monitor stand as claimed in claim 3, wherein;

the union of the second and third transverse tubular elements with the first, second, third, and fourth vertical tubular elements via the third, fourth, fifth, and sixth horizontal tubular extensions defines a rectangular inner frame which supports the horizontal plate and which can be tilted at a variety of angles depending on how the tightening joints are adjusted on the first and second vertical plates.

5. A multi-position television monitor stand as claimed in claim 1, further comprising:

third and fourth vertical tubular elements inserted respectively in the first and second vertical tubular elements;

fifth and sixth horizontal tubular extensions extending inwardly from said third and fourth vertical tubular elements, respectively, at a 90° angle;

a third transverse tubular element having first and second ends and a top surface, the fifth and sixth horizontal tubular extensions being inserted into the first and second ends, respectively, of the third transverse tubular element and fixed extending outwardly from the first and second ends of the third transverse tubular element at a predetermined distance using screws; and a horizontal plate attached to the top surface of the third transverse tubular element.

6. A multi-position television monitor stand as claimed in claim 5, wherein;

the union of the second and third transverse tubular elements with the first, second, third, and fourth vertical tubular elements via the third, fourth, fifth, and sixth horizontal tubular extensions defines a rectangular inner frame which supports the horizontal plate and which can be tilted at a variety of angles depending on how the tightening joints are adjusted on the first and second vertical plates.

7. A multi-position television monitor stand as claimed in claim 1, wherein:

the first and second pieces constitute a clamping joint that is adjustable to be at one of plural vertical locations on the vertical support, whereby the television monitor stand is rendered vertically adjustable.

* * * * *